United States Patent Office 3,297,633
Patented Jan. 10, 1967

3,297,633
PREPARATION OF POLYESTERS WITH LOW MELT VISCOSITY FROM A MIXTURE OF BISPHENOL ISOMERS
Raymond R. Hindersinn, Lewiston, N.Y., and André Jan Conix, Hove-Antwerp, Belgium; said Hindersinn assignor to Hooker Chemical Corporation, Niagara Falls, N.Y., a corporation of New York, and said Conix assignor to Gevaert Photo-Producten N.V., Mortsel, Belgium, a Belgian company
No Drawing. Filed July 25, 1962, Ser. No. 212,457
5 Claims. (Cl. 260—47)

It is known to prepare linear polyesters by polycondensing a metal diphenate of a bisphenol of the formula:

HO—Ar—R—Ar—OH with a diacid halide of an aromatic dicarboxylic acid of the formula:

HOOC—Ar'—R'—Ar—COOH wherein each of Ar and Ar' represents a p-phenylene radical, a m-phenylene radical, one of R and R' represents an alkyl substituted methylene group, an aryl substituted methylene group, or an alkyl- and aryl-substituted methylene group, a halogenated methylene group, a halomethyl substituted methylene group, or a carbon atom making part of a cycloaliphatic ring, and the other of R and R' may also represent such a group or atom, a single bond, an oxygen atom, a carbonyl group, a sulphonyl group or an alkylene radical.

In the reaction the metal diphenate of the bisphenol is dissolved in water and the diacid halide of the aromatic dicarboxylic acid is dissolved in an organic liquid which is immiscible with water and which is a solvent or a swelling agent for the polyester to be formed.

It appears from the intrinsic viscosity values, which are at least 0.4 dl./g. and which, in some cases, even reach 2.5 dl./g. that the thermoplastic polyesters obtained possess very high molecular weights. Moreover, they are soluble in low boiling solvents, e.g., chlorinated aliphatic hydrocarbons, and they can be cast from their solutions to colorless, transparent films. The higher the molecular weight, the better the mechanical properties of the polyesters of the films and of other shaped articles manufactured therefrom.

These polyesters, however, can only be injection molded into useful articles with great difficulty. The difficulties are due to the very high melt viscosity of the polymers. Indeed, these polymers show melt viscosities far in excess of the range which is suitable for conventional injection molding equipment (17,000 to 50,000 poises at 300 degrees centigrade). Raising the molding temperature in order to reduce the melt viscosity is not practical, because most molding equipment does not generally operate at temperatures above 300 degrees centigrade. Temperatures exceeding 300 degrees centigrade may also lead to polymer degradation.

It has now been found that polyesters derived from bisphenols and aromatic dicarboxylic acids having a low melt viscosity can be obtained by selecting as one of the starting materials a mixture of isomeric bis(hydroxyphenyl)-methanes.

According to the invention, linear, thermoplastic, high-molecular weight, soluble polyesters with low melt viscosity are obtained by polycondensing metal diphenates of a mixture of bis(hydroxphenyl)-methanes dissolved in water, with one or more diacid halides of aromatic dicarboxylic acids dissolved in an organic liquid which is immiscible with water and wherein the polyester to be formed is soluble to some extent, wherein the mixture of isomeric bis(hydroxyphenyl)-methanes contains a maximum of seventy weight percent of 4,4'-bis(hydroxyphenyl)-methane.

The diacid halides of aromatic dicarboxylic acids which can be used in the polycondensation according to the invention can be obtained by the reaction of aromatic dicarboxylic acids with thionyl chloride. Suitable aromatic dicarboxylic acids are among others:

terephthalic acid
isophthalic acid
phthalic acid
bis(4-carboxy)-diphenyl
bis(4-carboxyphenyl)-ether
bis(4-carboxyphenyl)-sulphone
bis(4-carboxyphenyl)-carbonyl
bis(4-carboxphenyl)-methane
bis(4-carboxyphenyl)-dichloromethane
1,2- and 1,1-bis(4-carboxyphenyl)-ethane
1,1- and 2,2-bis(4-carboxyphenyl)-propane
1,1- and 2,2-bis(3-carboxyphenyl)-propane
2,2-bis(4-carboxyphenyl)-1,1-dimethyl-propane
1,1- and 2,2-bis(4-carboxyphenyl)-butane
1,1- and 2,2-bis(4-carboxyphenyl)-pentane
3,3-bis(4-carboxyphenyl)-heptane
3,3-bis(3-carboxyphenyl)-heptane The polycondensation of the metal diphenates of the mixture of isomers of bis(hydroxyphenyl)-methane with diacid halides of aromatic dicarboxylic acids is carried out in the presence as catalysts of one or more compounds selected from the group consisting of onium compounds such as quaternary ammonium compounds, tertiary sulphonium compounds, quaternary phosphonium compounds and quaternary arsonium compounds. These catalysts are preferably added in amounts between 0.01 and 5 percent, calculated on the weight of the mixture of metal diphenates used. The most effective catalysts are soluble in the aqueous phase as well as in the organic phase and may be added to the reaction mixture before, during or after mixing of the two phases.

The polycondensation reaction may be carried out at temperatures between −10 degrees centigrade and the boiling point of the organic solvent used. If a diacid halide is employed which is sensitive to hydrolysis, it is indicated to cool the reaction mixture to 0 degrees centigrade or even lower so as to avoid this hydrolysis as much as possible.

Water is used as the solvent for the metal diphenates and halogenated hydrocarbons, such as, e.g., methylene chloride, chloroform, 1,2-dichloroethane, 1,1,2-trichloroethane, sym-tetrachloroethane, methylchloroform, etc., as common solvent for the diacid halide and the polyester to be formed by the reaction. Other water-immiscible organic solvents such as benzene, toluene, etc., can be used in association with the above mentioned solvents.

The process may be performed using one or more additional compounds (i.e., compounds additional to the said metal diphenates and/or the diacid halides) which provide elements or groups in minor amounts which enter into the structure of the final polyester. We would refer, in particular, to the performance of the process by condensing with the diacid halides not only the metal diphenates of the mixture of isomers but also one or more metal diphenates of other bis-phenols, e.g., 2,2-bis(4-hydroxyphenyl)-propane (bisphenol A), and/or by using in conjunction with the diacid halides of aromatic dicarboxylic acids, diacid halides of other dicarboxylic acids and/or diacid halides of aromatic disulphonic acids and/or diacid halides of aromatic monocarboxysulphonic acids.

According to the preferred embodiment of the invention, the polycondensation is performed between a mixture of metal diphenates of isomer bis(hydroxyphenyl)- methanes and diacid halides of one or more aromatic dicarboxylic acids, the metal diphenates being selected so that a maximum of seventy percent of the 4,4'-isomer is present and such that a maximum of eighty percent of the 2,2'-isomer is present. Using these criteria, polyesters result having reasonably low melt viscosities and yet which are not unduly brittle to be practical in molded articles.

A suitable starting mixture of isomeric bisphenols may be prepared by reaction of formaldehyde with an excess of phenol. Thus, when reacting formaldehyde with an excess of phenol in the presence of an acidic catalyst, it is found that the reaction products, in general, consist of about 44 percent by weight of 4,4'-bis(hydroxphenyl)-methane, 53 percent by weight of 2,4'-bis(hydroxyphenyl)-methane, and 3 percent by weight of 2,2'-bis(hydroxyphenyl)-methane. The melting point of the mixture of isomers is about 100 to 110 degrees centigrade, and the yield of the reaction approximately 70 percent. Such a mixture of isomers can, therefore, be used directly in the polycondensation reaction, starting by dissolving the isomer mixture in water in the presence of equivalent amounts of alkali hydroxides such as sodium hydroxide or potassium hydroxide. When mixtures having a high proportion of the 2,2'-isomer are desired, the reaction of phenol and formaldehyde is carried out in the presence of a basic catalyst such as zinc oxide.

The metal diphenates are formed by dissolving the bisphenol in water in the presence of equivalent quantities of alkali-metal hydroxides such as the hydroxides of sodium, potassium, rubidium and cesium.

In addition to the advantage of the low cost-price of the starting materials, the invention presents various additional advantages, including the following. In manufacturing a mixture of isomers by reacting phenol and formaldehyde, there is obtained, in addition to the (about 70 percent) yield of mixture of isomers, also about 30 percent of a prepolymer of the phenol-formaldehyde type, which can be worked up to phenol-formaldehyde molding powders.

The melt viscosity of the polymers of the invention does not generally exceed 1,000,000 poises, and preferably does not exceed about 100,000 poises as measured by ASTM D–1238–57T. More preferably, the melt viscosity is less than 50,000 poises.

The polyesters of the present invention are soluble in low boiling solvents. Depending upon the special chemical structure of each of the polyesters involved, they are soluble in at least on halogenated hydrocarbon such as methylene chloride, chloroform 1,2-dichloroethane, sym-tetrachloroethane, methylchloroform, 1,1,2 - trichloroethane, etc. Most of the polyesters according to the invention, however, are soluble in more than one of the above mentioned halogenated hydrocarbons and are, moreover, soluble in other solvents such as benzene, toluene, dioxan, tetrahydrofuran, etc.

From a solution in methylene chloride or sym-tetrachloroethane the polyesters can be cast into colorless transparent films. Upon stretching these films, the mechanical properties can be greatly enhanced.

As a result of their low melt viscosity the polyesters obtained by the present invention find their most interesting application as injection molding materials. Further, the polyesters can be pelleted in a known way and be worked up in the usual extrusion equipment.

The polyesters obtained from mixtures of isomers according to the invention are also useful in the field of photographic materials. They can, for instance, be used in the manufacture of film base, as an adhesive layer, as a subbing layer between the photographic light-sensitive emulsion layer and the film base, as a binder in filter layers, antistress layers and antistatic layers, as a binder in electrophotographic coatings, as a base or a binder for magnetic tape and as a binder in the manufacture of thermoplastic recording tape.

Heating in an oxygen containing atmosphere of films or other shaped articles from the new polyesters generally renders these articles insoluble in organic solvents. Probably a cross-linking reaction occurs which possibly can be attributed to the reactivity of the activated methylene group situated between the two aromatic rings.

When the polyesters are made using both the bisphenol F isomers and bisphenol A, the resistance of the resulting copolymers to stress cracking in the presence of solvents such as acetone, carbon tetrachloride, benzene and ethyl acetate is greatly improved over similar results with polymers based on bisphenol A.

The intrinsic viscosities $[\eta]$ of the prepared polymers were measured at 25 degrees centigrade in sym-tetrachloroethane unless otherwise stated.

The following examples illustrate the invention without limiting, however, the scope.

*Example 1*

In a 1 liter three-necked, creased flask fitted with a condenser, a stirrer, a nitrogen inlet and a thermometer, 15.0 g. (0.075 mole) of bisphenol F are dissolved in 225 cm.³ of an aqueous soution of 7 g. of sodium hydroxide. To this mixture is added 0.6867 g. of benzyltrimethylammonium chloride followed by 225 cm.³ of a solution of 15.2273 g. (0.075 mole) of isophthaloyl chloride in methylene chloride. The mixture is stirred at a rate of approximately 1,300 r.p.m. for exactly 20 minutes, after which time it is allowed to stand for a few minutes whereupon it separates into two layers. The upper (aqueous) layer is decanted and the bottom organic layer is slowly poured into a vigorously agitated excess of acetone in order to precipitate the polymer. The polymer is separated by filtration and washed until the washings react negatively to the silver nitrate test for chloride ion. It is then dried for 20 hours at 120° C. in an oven by circulating air.

$[\eta] = 1.42$ dl./g.

*Example 2*

In this example a chain terminator is added to the reaction mixture.

In a 1 liter three-necked, creased flask fitted with a condenser, a stirrer, a nitrogen inlet, and a thermometer, 15.0 g. (0.075 mole) of bisphenol F are dissolved in 225 cm.³ of an aqueous solution of 7 g. of sodium hydroxide. To this mixture is added 0.6867 g. of benzyltrimethylammonium chloride followed by 225 cm.³ of a solution of 15.2273 g. (0.075 mole) of isophthaloyl chloride and 0.1913 g. of p-tert-butylphenol in methylene chloride. The mixture is stirred for exactly 20 minutes at a rate of approximately 1,200 r.p.m., after which time it is allowed to stand for a few minutes. The mixture is emulsified and is poured slowly into a vigorously agitated excess of acetone in order to precipitate the polymer. The polymer is separated by filtration and washed until the washings react negatively to the silver nitrate test for chloride ion. It is then dried for 20 hours at 120° C. in an oven by circulating air.

$[\eta] = 0.81$ dl./g.

The melt viscosity of the poly(bisphenol F/isophthalate) is determined by ASTM D–1238–57T, using a Tinius-Olsen viscometer and found to be 46,000 poises at an intrinsic viscosity of 0.7. The melt viscosities of the comparable poly(bisphenol A/isophthalate) and polycarbonate are 270,000 and 45,000, respectively.

*Example 3*

Several mixtures of bisphenol F isomers are prepared in the following manner:

A 5-liter flask is charged with 4.0 liters (45.5 moles) of phenol. A current of nitrogen gas is passed continuously through the flask. An addition of 27 milliliters of concentrated hydrochloric acid and 428 milliliters of distilled water is made to the reaction flask. The temperature is cooled from room temperature to 10–15° C. and 369 grams of 37% formalin (4.55 moles) is added over a period of one hour with slow stirring. The reaction flask is allowed to warm up gradually to room temperature and is stirred continuously for a period of 26.5 hours after the completion of the formaldehyde addition. The contents of the flask are then subjected to vacuum distillation to remove water, hydrogen chloride and excess phenol. The bisphenol-F reaction products are vacuum distilled to yield three bisphenol-F fractions of varying composition with respect to the 2,2-; 2,4-; and 4,4-bisphenol-F isomers.

The proportions of the isomers in the composite sample and the three fractions are as follows:

|  | Isomer | | |
| --- | --- | --- | --- |
|  | 2,2' | 2,4' | 4,4' |
| Composite | 1 | 44 | 55 |
| Fraction A | 3 | 58 | 39 |
| Fraction B | 1 | 60 | 39 |
| Fraction C | 0 | 29 | 71 |

These samples are used in the preparation of polymers in the succeeding examples.

*Example 4*

The sample of bisphenol-F isomers designated as Fraction A in Example 3 is employed in the preparation of a polymer.

Sodium hydroxide, 152 milliliters of a 0.759 normal solution, is charged into a 0.5-liter flask equipped with a stirrer, thermometer, water cooled condenser, compensating addition funnel and nitrogen gas inlet. Nitrogen gas is passed continuously through the flask and out the condenser. Bisphenol-F (0.05 mole) is charged into the reaction flask using 40 milliliters of distilled water as a wash aid. After the bisphenol-F dissolves, benzyltrimethylammonium chloride (0.0015 mole) is charged into the reaction flask followed by the addition of 50 milliliters of methylene chloride. Isophthaloyl chloride (0.05 mole) dissolved in 50 milliliters of methylene chloride is then immediately added over a period of ten minutes with very vigorous stirring. The reaction temperature proceeds from room temperature to the reflux temperature of methylene chloride. After the addition of the methylene chloride-isophthaloyl chloride solution the addition funnel is washed with 50 milliliters of methylene chloride and the washings are added to the interfacial reaction mixture. The reaction mixture is then rapidly stirred for 2 hours at room temperature before addition of 20 milliliters of concentrated hydrochloric acid diluted with 20 milliliters of water to neutralize the quaternary catalyst. An additional 200 milliliters of methylene chloride is added for dilution and the resulting polymer solution is washed with distilled water until chloride free as determined by the use of silver nitrate solution. The polymer is precipitated by the addition of acetone to the polymer solution. After drying the polymer is found to possess an intrinsic viscosity of 1.07 dl./g. as determined in sym-tetrachlorethane at 30° C.

Additional properties of the polymer are shown in Table I.

*Examples 5–7*

Additional polymers are prepared using the procedure of Example 4 with Fractions B and C and Composite mixture prepared in Example 3. The properties of these polymers appear in Table I.

*Examples 8–10*

Polymers are prepared in accordance with the procedure of Example 4 using a mixture of bisphenol-F isomers containing 75 percent of the 2,2'-isomer and 25 percent of the 2,4'-isomer. In Example 8, the diacid chloride is isophthaloyl chloride, in Example 9, the diacid chloride is terephthaloyl chloride. In Example 10, the diacid chloride is isophthaloyl chloride and a mixture of 50 parts of bisphenol-F and 50 parts of bisphenol-A is used. The properties appear in Table I.

In the following examples the term bisphenol F is used for identifying a mixture consisting of about 44% by weight of 4,4'-bis(hydroxyphenyl)-methane, 53% by weight of 2,4'-bis(hydroxyphenyl)-methane, and 3% by weight of 2,2'-bis(hydroxyphenyl)-methane. By the term bisphenol A, 2,2-bis(4-hydroxyphenyl)-propane is meant.

*Example 11*

10.013 g. of bisphenol F, 103 cm.$^3$ of 0.99 N aqueous sodium hydroxide, 50 mg. of triphenylbenzyl phosphonium chloride and 50 cm.$^3$ of 1,1,2-trichloroethane are successively brought into a three-necked 250 cm.$^3$ flask provided with a stirrer and a dropping funnel. While stirring and at 25° C., a solution of 2.538 g. of terephthaloyl chloride and 7.614 g. of isophthaloyl chloride in 70 cm.$^3$ of 1,1,2-trichloroethane is added dropwise in 10 minutes. Then, the reaction mixture is stirred at room temperature for another hour whereby the polymer separates as a viscous mass. The supernatant aqueous layer is decanted and the residue washed two times with 200 cm.$^3$ of water with good agitation. The polymer precipitates by pouring the polymer solution into ethanol, fol-

TABLE I

| Ex. No. | Polymer | Isomer Comp. of Bisphenol F Weight, Percent | | | Initial Intrinsic Visc., dl./g. | Melt Visc. and Intrinsic Visc. at 275° C. | | Melt Visc. and Intrinsic Visc. at 300° C. | | Melt Visc. and Intrinsic Visc. of a Bisphenol A-Isophthalate at 300° C. | |
| --- | --- | --- | --- | --- | --- | --- | --- | --- | --- | --- | --- |
|  |  | 2,2' | 2,4' | 4,4' |  | $\eta$ Poises | $[\eta]$ dl./g. | $\eta$ Poises | $[\eta]$ dl./g. | $\eta$ Poises | $[\eta]$ dl./g. |
| 4 | Bisphenol F-isophthalate | 3 | 58 | 39 | 1.07 | 36,225 | 0.65 |  |  |  |  |
| 5 | Bisphenol F-isophthalate | 1 | 60 | 39 | 1.60 |  |  | 132,400 | 0.86 | 800,000 | 0.86 |
| 6 | Bisphenol F-isophthalate | 0 | 29 | 71 | 1.61 |  |  | ca. 1,000,000 |  |  |  |
| 7 | Bisphenol F-isophthalate | 1 | 44 | 55 | 1.99 |  |  | 646,000 | 0.96 | 1,400,000 | 0.96 |
| 8 | Bisphenol F-isophthalate | 75 | 25 | 0 | 2.14 | 10,000 at 250° C. | 0.61 |  |  |  |  |
| 9 | Bisphenol F-terephthalate | 75 | 25 | 0 | 1.70 | <10,000 | 0.53 |  |  |  |  |
| 10 | Copolymer of bisphenol F, bisphenol A, isophthaloyl chloride. | 75 | 25 | 0 | 2.64 |  |  | 219,000 | 1.07 | 2,400,000 | 1.07 |

Intrinsic Viscosities Determined in Sym-Tetrachloroethane at 30° C.
Melt Viscosities Determined by ASTM 1238-57T With Tinius-Olsen Viscometer.

lowed by grinding in a Waring Blendor and drying the precipitate at 100° C. The intrinsic viscosity was measured at 25° C. in a mixture of 60 parts of phenol and 40 parts of sym-tetrachloroethane and found to be 1.50 dl./g.

*Example 12*

10.013 g. of bisphenol F, 102.4 cm.$^3$ of 0.996 N aqueous sodium hydroxide, 200 mg. of triethylbenzyl ammonium chloride and 50 cm.$^3$ of 1,1,2-trichloroethane are successively brought into a three-necked 250 cm.$^3$ flask provided with a stirrer and a dropping funnel. While stirring and at 20° C., a solution of 2.538 g. of terephthaloyl chloride and 7.614 g. of isophthaloyl chloride in 50 cm.$^3$ of 1,1,2-trichloroethane is added dropwise in 10 minutes. Then, the reaction mixture is stirred at room temperature for another 2 hours whereby the polymer separates as a viscous mass. The supernatant aqueous layer is decanted and the residue washed two times with 200 cm.$^3$ of water with good agitation. The polymer precipitates by pouring the polymer solution into ethanol, is sucked off and dried at 110° C. $[\eta]=1.0$ dl./g. A film cast from a methylene chloride solution shows the following physical characteristics:

Softening point, ° C. _____ 130
Tensile strength, kg./sq. mm. _____ 6.8
Yield strength, kg./sq. mm. _____ 7.1
Elongation at break, percent _____ 134
Modulus of elasticity, kg./sq. mm. _____ 214

*Example 13*

20.03 g. of bisphenol F, 250 cm.$^3$ of water, 8.5 g. of sodium hydroxide, 100 mg. of triphenylbenzyl phosphonium chloride and 100 cm.$^3$ of 1,1,2-trichloroethane are successively brought into a three-necked 500 cm.$^3$ flask provided with a stirrer and a dropping funnel. While stirring and at a temperature between 10 and 20° C., a solution of 34.3 g. of di-acid chloride of bis(4-carboxyphenyl)-sulphone in 150 cm.$^3$ of 1,1,2-trichloroethane is added dropwise in 5 minutes. Then the reaction mixture is stirred at room temperature for another 90 minutes whereby the polymer separates as a viscous mass. The supernatant aqueous layer is decanted and the residue washed two times with 500 cm.$^3$ of water with good agitation. The polymer precipitates by pouring the organic layer into ethanol, is sucked off and dried at 110° C. The intrinsic viscosity was measured in a mixture of 60 parts phenol and 40 parts sym-tetrachloroethane and found to be 1.32 dl./g.

*Example 14*

10.013 g. of bisphenol F, 102.4 cm.$^3$ of 0.996 N aqueous sodium hydroxide, 70 mg. of triphenylmethyl arsonium iodide and 50 cm.$^3$ of 1,1,2-trichloroethane are successively brought into a three-necked 250 cm.$^3$ flask provided with a stirrer and a dropping funnel. While stirring and at 15° C., a solution of 17.16 g. of diacid chloride of bis-(4-carboxyphenyl)-sulphone in 70 cm.$^3$ of 1,1,2-trichloroethane is added dropwise in 5 minutes. Then the reaction mixture is stirred at room temperature for another hour. The polymer suspension is washed with 1 liter of water for a period of 1 hour. The polymer is then isolated by treating with ethanol. The precipitate is sucked off and dried at 110° C. $[\eta]=1.25$ dl./g. Films can be cast from a sym-tetrachloroethane solution.

*Example 15*

10.03 g. of bisphenol F, 102.4 cm.$_3$ of 0.996 N aqueous sodium hydroxide, 400 mg. of triethylbenzyl ammonium chloride and 20 cm.$^3$ or 1,1,2-trichloroethane are successively brought into a three-necked 250 cm.$^3$ flask provided with a stirrer and a dropping funnel. While stirring and at 20° C., a solution of 14.76 g. of diacid chloride of bis(4-carboxyphenyl)-ether in 80 cm.$^3$ of 1,1,2-trichloroethane is added dropwise in 10 minutes. Then the reaction mixture is stirred at room temperature for another 3 hours whereby the polymer separates as a viscous mass. The supernatant aqueous layer is decanted and the residue washed two times with 200 cm.$^3$ of water while strongly stirring. The polymer precipitates by pouring the polymer solution into ethanol, is sucked off and dried at 110° C. $[\eta]=1.34$ dl./g. A film cast from a methylene chloride solution shows the following physical properties:

Softening point, ° C. _____ 145
Tensile strength, kg./sq. mm. _____ 6.8
Yield strength, kg./sq. mm. _____ 6.1
Elongation at break, percent _____ 152
Modulus of elasticity, kg./sq. mm. _____ 177

The glass transition temperature was determined by thermal analysis and found to be 150° C.

*Example 16*

10.013 g. of bisphenol F, 102.4 cm.$^3$ of 0.996 N aqueous sodium hydroxide, 50 mg. of triphenylmethyl arsonium iodide and 50 cm.$^3$ of 1,1,2-trichloroethane are successively brought into a three-necked 250 cm.$^3$ flask provided with a stirrer and a dropping funnel. While stirring and at 20° C., a solution of 10.152 g. of isophthaloyl chloride in 50 cm.$^3$ of 1,1,2-trichloroethane is added dropwise in 5 minutes. Then the reaction mixture is stirred at room temperature for another hour whereby the polymer separates as a viscous mass. The supernatant aqueous layer is decanted and the residue washed two times with 200 cm.$^3$ of water with good agitation. The polymer precipitates by pouring the polymer solution into ethanol, is sucked off and dried at 110° C. $[\eta]=1.2$ dl./g. A film cast from a solution in a mixture of 1,1,2-trichloroethane and sym-tetrachloroethane shows the following physical properties:

Softening point, ° C. _____ 125
Tensile strength, kg./sq. mm. _____ 6.3
Yield strength, kg./sq. mm. _____ 5.8
Elongation at break, percent _____ 12.1
Modulus of elasticity, kg./sq. mm. _____ 255

*Example 17*

10.013 g. of bisphenol F, 102.4 cm.$^3$ of 0.996 N aqueous sodium hydroxide, 50 mg. of triphenylmethyl arsonium iodide and 50 cm.$^3$ of 1,1,2-trichloroethane are successively brought into a three-necked 250 cm.$^3$ flask provided with a stirrer and a dropping funnel. While stirring and at 15° C., a solution of 10.152 g. of terephthaloyl chloride in 50 cm.$^3$ of 1,1,2-trichloroethane is added dropwise in 5 minutes. Then the reaction mixture is stirred at room temperature for another hour, and the polymer separates as a very viscous mass. The supernatant aqueous layer is decanted and the residue washed two times with 250 cm.$^3$ of water with good agitation. The polymer precipitates by pouring the polymer solution into ethanol, is sucked off and dried at 110° C. $[\eta]=1.45$ dl./g.

*Example 18*

6.570 g. of bisphenol F, 67.3 cm.$^3$ of 0.996 N aqueous sodium hydroxide, 50 mg. of triphenylmethyl arsonium iodide and 30 cm.$^3$ of 1,1,2-trichloroethane are successively brought into a three-necked 250 cm.$^3$ flask provided with a stirrer and a dropping funnel. While stirring and at 15° C., a solution of 9.165 g. of diacid chloride of bis(4-carboxy)-diphenyl in 70 cm.$^3$ of 1,1,2-trichloroethane is added dropwise in 5 minutes. Then the reaction mixture is stirred at room temperature for another hour; the mixture becomes very viscous and a mixture of 100 cm.$^3$ of water and 50 cm.$^3$ of methylene chloride were added to permit stirring. The polymer solution is then washed two times with 200 cm.$^3$ of water with good agitation. The polymer precipitates by pouring the polymer solution into ethanol, is sucked off and dried at 110° C. $[\eta]=0.92$ dl./g.

Example 19

5.065 g. of bisphenol F, 5.775 g. of bisphenol A, 102.5 cm.³ of 0.995 N aqueous sodium hydroxide, 50 mg. of triphenylmethyl arsonium iodide and 50 cm.³ of 1,1,2-trichloroethane are successively brought into a three-necked 250 cm.³ flask provided with a stirrer and a dropping funnel. While stirring and at 10° C., a solution of 10.152 g. of isophthaloyl chloride in 50 cm.³ of 1,1,2-trichloroethane is added dropwise in 5 minutes. Then the reaction mixture is stirred at room temperature for another 30 minutes whereby the polymer separates as a viscous mass. The supernatant aqueous layer is decanted and the residue washed two times with 200 cm.³ of water, with good agitation. The polymer precipitates by pouring the polymer solution in ethanol, is sucked off and dried at 110° C. $[\eta]=1.0$ dl./b.

A film cast from a methylene chloride solution shows the following physical properties:

| | |
|---|---|
| Softening point, °C. | 140 |
| Tensile strength, kg./sq.mm. | 6.85 |
| Yield strength, kg./sq. mm. | 7.05 |
| Elongation, at break, percent | 37 |
| Modulus of elasticity, kg./sq. mm. | 203 |

Several other molar proportions of bisphenol F versus bisphenol A were evaluated. The properties of some of these copolyesters are summarized in the following table.

| Mole, percent bisphenol | | Solubility in methylene chloride | Intrinsic viscosity $[\eta]$ | Softening point, °C. | Modulus of elast., kg./sq. mm. | Yield strength, kg./sq. mm. | Tensile strength, kg./sq. mm. | Elongation at break, percent |
|---|---|---|---|---|---|---|---|---|
| F | A | | | | | | | |
| 50 | 50 | + | 1.0 | 140 | 203 | 7.05 | 6.85 | 37 |
| 40 | 60 | + | 0.80 | 150 | 215 | 7.7 | 7.0 | 20.3 |
| 30 | 70 | Insuff. | 1.46 | 100 | 227 | 6.85 | 6.34 | 7.0 |
| 20 | 80 | Minus | 1.4 | 130 | 206 | 6.2 | 5.92 | 45.2 |

It is understood that the details provided in the foregoing specification can be modified by those skilled in the are without departing from the scope of the invention.

What we claim is:

1. A linear, high molecular weight polyester of an aromatic dicarboxylic acid and a mixture of isomers of bis-(hydroxyphenyl)-methane containing at least twenty-five weight percent 2,4'-bis(hydroxyphenyl)-methane, 4,4'-bis(hydroxyphenyl)-methane in a maximum proportion of seventy weight percent, and 2,2'-bis(hydroxyphenyl)-methane in a maximum proportion of seventy-five weight percent.

2. A linear, high molecular weight polyester of an aromatic dicarboxylic acid and a mixture of (a) 2,2-bis(4-hydroxyphenyl)-propane and at least twenty mole percent of (b) a mixture of isomers of bis(hydroxyphenyl)-methane containing at least twenty-five weight percent 2,4'-bis(hydroxyphenyl)-methane, 4,4'-bis(hydroxyphenyl)-methane in a maximum proportion of seventy weight percent, and 2,2'-bis(hydroxyphenyl)-methane in a maximum proportion of seventy-five weight percent.

3. The polyester of claim 1 wherein the aromatic dicarboxylic acid is isophthalic acid.

4. The polyester of claim 1 wherein the aromatic dicarboxylic acid is terephthalic acid.

5. The polyester of claim 2 wherein the aromatic dicarboxylic acid is isophthalic acid.

References Cited by the Examiner

UNITED STATES PATENTS

| | | | |
|---|---|---|---|
| 3,028,364 | 4/1962 | Conix et al. | 260—47 |
| 3,036,992 | 5/1962 | Holub et al. | 260—47 |
| 3,185,664 | 5/1965 | Conix | 260—47 |
| 3,216,970 | 11/1965 | Conix | 260—47 |

OTHER REFERENCES

Conix: Ind. Eng. Chem, vol. 51, pp. 147–150, February 1959.

WILLIAM H. SHORT, *Primary Examiner.*

J. C. MARTIN, *Assistant Examiner.*